United States Patent

[11] 3,573,619

| [72] | Inventor | Martin Ivec<br>Joliet, Ill. |
|---|---|---|
| [21] | Appl. No. | 797,747 |
| [22] | Filed | Feb. 10, 1969 |
| [45] | Patented | Apr. 6, 1971 |
| [73] | Assignee | Motorola, Inc.<br>Franklin Park, Ill. |

[54] ELECTROMAGNETIC SYSTEM FOR SCALING FREQUENCIES WHICH ARE PROPORTIONAL TO THE ANGULAR VELOCITIES OF SELECTED ROTATING SHAFTS
5 Claims, 4 Drawing Figs.

[52] U.S. Cl. .................................................. 324/174,
 324/78
[51] Int. Cl. .................................................. G01p 3/48
[50] Field of Search .......................................... 324/69, 70,
 78, 115, (Inquired); 73/510

[56] References Cited
UNITED STATES PATENTS

| 2,705,303 | 3/1955 | Stinger | 324/70 |
| 2,978,599 | 4/1961 | Wilcox | 324/70(UX) |
| 3,202,910 | 8/1965 | Fathauer | 324/78 |
| 3,456,187 | 7/1969 | Schmidt | 324/70 |

*Primary Examiner*—Michael J. Lynch
*Attorney*—Mueller and Aichele

ABSTRACT: Electromagnetic system for providing a reading proportional to the instantaneous angular velocity of any one of a plurality of rotating shafts. Each of the shafts rotates a disc which has a predetermined number of apertures distributed thereabout to consequently vary the reluctance in a magnetic flux path thereby generating an alternating voltage having a frequency proportional to both the number of apertures and the angular velocity of the shaft. The number of apertures in each disc can be selected to provide frequency scaling. Any one of the alternating voltages can be coupled to an indicating device which develops the reading.

Patented April 6, 1971
3,573,619
2 Sheets-Sheet 1
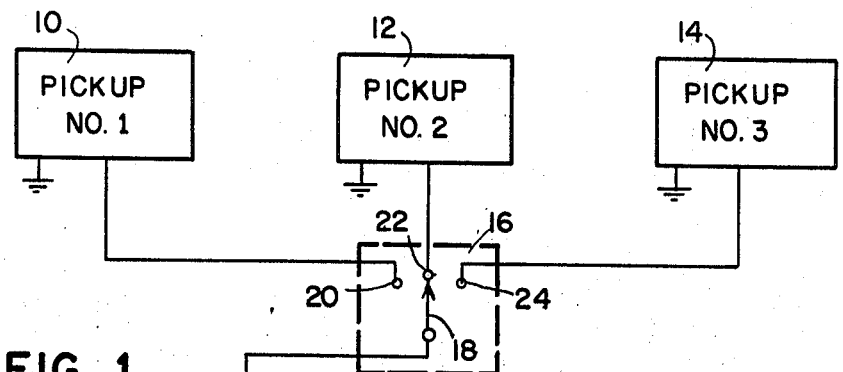
FIG. 1
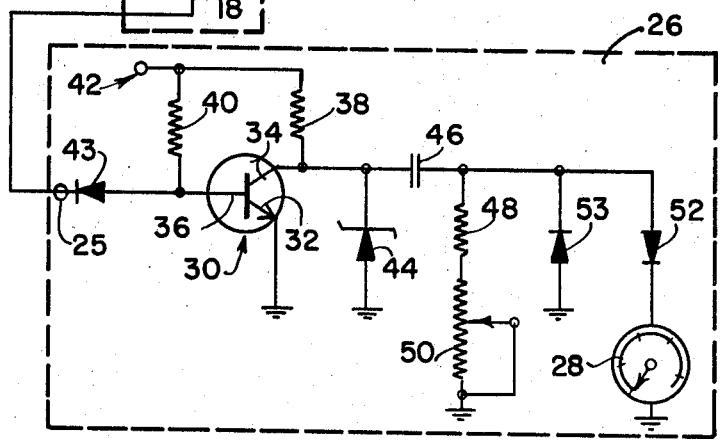
FIG. 2
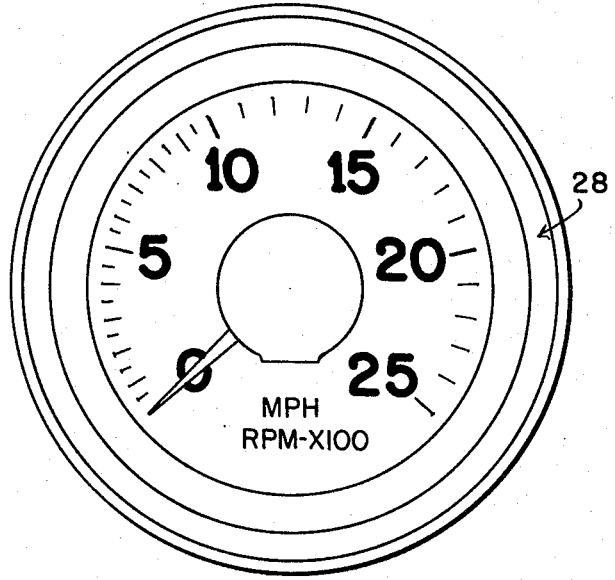
Inventor
MARTIN IVEC
BY
Mueller, Aichele & Rauner
ATTYS.

Patented April 6, 1971

Invntor
MARTIN IVEC
BY
Mueller, Aichele & Rauner
ATTYS.

3,573,619

ELECTROMAGNETIC SYSTEM FOR SCALING FREQUENCIES WHICH ARE PROPORTIONAL TO THE ANGULAR VELOCITIES OF SELECTED ROTATING SHAFTS

BACKGROUND OF THE INVENTION

It is desirable for an operator of certain kinds of mechanical machinery to be provided with readings of the angular velocities of selected shafts included therein. In certain applications the r.p.m. of a conveniently located shaft will be monitored to provide an indirect reading of the r.p.m. of an inaccessible shaft coupled thereto and rotating at a proportional speed. Also, it is sometimes desirable for the operator to be able to selectively read the r.p.m. of some shafts for one mode of operation of the machinery and the r.p.m. of other shafts for other modes of operation. For example, an operator of a combine needs to know the ground speed thereof in miles per hour when on the highway, the r.p.m. of the threshing drum when harvesting grain in the field, and the engine r.p.m. when in either mode of operation. Such readings have been provided in the past, for instance, by mechanical devices which include a rotatable cable enclosed in a flexible housing and which extends from the monitored shaft to an indicating or readout device. In applications where there is a substantial distance between the monitored shaft and the indicating device, this cable with its housing tends to become expensive, and where there are space limitations or obstructions in its path, the installation of the cable can be very difficult. In addition, oil and dirt sometimes get into the housing thereby causing the cable, particularly in cold weather, to bind up which consequently results in an inaccurate reading on the indicating device. Furthermore, where it is desirable to individually monitor with one indicating device, selected ones of a plurality of shafts each rotatable at a different maximum r.p.m.s, it is difficult to switch the outputs of the cable associated with the respective shafts to the indicating device. The two most common methods of providing a scale factor for a common readout of several shafts in the rotating cable system a are the use of a gearing arrangement associated with the cables or the use of a plurality of scales on the indicating device. The gearing arrangement adds cost to the system and a plurality of scales is generally unsatisfactory.

SUMMARY OF THE INVENTION

An object of the invention is to provide an electrical, angular velocity sensing system which is simple, reliable, and relatively inexpensive as compared to mechanical systems.

Another object of the invention is to provide an electrical, angular velocity sensing system having one indicating device that can be conveniently switched to monitor any one of a plurality of shafts rotating even at substantially different angular velocities.

A further object is to provide an electrical angular velocity system for selectively developing a reading proportional to the angular velocity of each one of a plurality of shafts without using gears or additional parts whose sole functions are to provide scale factors.

A still further object is to provide an electrical, angular velocity sensing system having one scale on the readout device for giving indications proportional to the angular velocities of each of a plurality of shafts which are rotatable at substantially different speeds.

A preferred embodiment of the invention is comprises of an indicating device which, with its indicating meter and associated circuitry, gives a reading proportional to the frequency of a selected one of many alternating voltages produced by a plurality of variable reluctance generators driven by shafts whose angular velocities are to be monitored. Each variable reluctance generator includes at least one magnet for generating magnetic flux, a flux path including an air gap, and a coil electrically coupled to the magnetic flux so as to develop a voltage according to the time rate of change thereof. A disc made of a low reluctance material and having a predetermined number of apertures or holes selectively placed on the circumference of a circle thereon is interposed in the air gap. This disc is fastened to the shaft and rotated through the flux. As a result the apertures and the intervening low reluctance material alternately cause the flux to increase and decrease through the flux path thereby inducing an alternating voltage in the coil. This alternating voltage is selectively connected to the indicating device by an inexpensive single conductor, insulated wire. The frequency of this alternating voltage depends on both the angular velocity of the shaft turning the disc and on the number of apertures located in the disc. By discriminately choosing the number of apertures in each of the discs of a particular system the following two conditions can be met: first, an appropriate scale factor can be introduced into the frequency of a reading related to the r.p.m. of any particular shaft. For example, if it is desired to double the present frequency of a generated voltage of a particular variable reluctance generator, its present disc could be replaced by one having twice as many apertures. Secondly, the maximum frequencies of all the respective generators relating to a plurality of shafts can be scaled by discriminately choosing the number of apertures in each disc in inverse proportion to the maximum rotational velocity of the shaft driving the same as to allow one scale on the indicating device. For example, a single scale marked from 0 to 25 would indicate from 1 to 100 r.p.m., or 0 to 2500 r.p.m. corresponding to a second shaft turning from 0 to 2500 r.p.m.

BRIEF DESCRIPTION OF THE DRAWING

FIG. 1 is a diagram of the system of one embodiment of the invention showing alternating voltage generators in block form and the circuitry of the indicating device in schematic form;

FIG. 2 shows a detailed view of the single scale on the meter of the indicating device;

DETAILED DESCRIPTION OF THE PREFERRED EMBODIMENT

Figure 3:
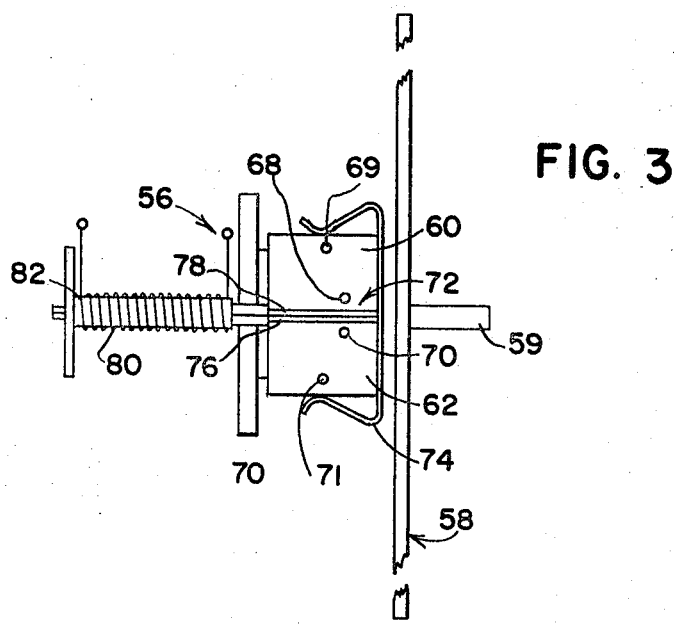
FIG. 3 shows a side view of a variable reluctance, alternating voltage generator.

Referring now to FIG. 1, blocks 10, 12 and 14 each represent a variable reluctance generator or pickups which develops an alternating voltage having a frequency and amplitude proportional to the angular velocity of a shaft connected thereto. One such generator will be described in detail in a later part of this description. Rotary switch 16 includes wiper 18 for connecting a voltage from any one of generators 10, 12 and 14, which are respectively connected to contacts 20, 22 and 24 to the input terminal 25 of the angular velocity indicating device included in block 26. Meter 28 of the indicating device provides a reading which is proportional to the frequency of the selected generated voltage.

The following description will first relate to the indicating device of block 26 which includes NPN transistor 30 having its emitter 32 directly connected to a ground or reference potential; and its collector 34 and base 36 respectively connected through biasing resistors 38 and 40 to a direct current biasing potential at terminal 42. The values of resistors 38 and 40 are chosen to bias transistor 30 into saturation. Base 36 is connected through diode 43 to input terminals 25 of the indicating device, collector 34 is connected through Zener diode 44 to ground and through the differentiating network comprises of capacitor 46 and the series in combination of resistor 48 and variable resistor or potentiometer 50 to ground. Diode 52 is connected from the junction of capacitor 46 and resistor 48 to angular velocity indicating meter 28. While transistor 30 is in saturation, essentially no voltage is developed at its collector 34 and consequently no current is applied through capacitor 46 and diode 52 to meter 28. Inasmuch as the instantaneous reading on meter 28 is proportional to the integral or summation of the current applied thereto the meter will read zero while transistor 30 is in saturation.

In operation, a voltage whose amplitude and frequency is proportional to the angular velocity of a particular shaft is provided to input terminal 25 from a generator. Diode 43 is oriented so as to block to positive portions of the alternating voltage and allow the negative portions to be applied to base 36 of transistor 30. Provided that these negative portions have sufficient amplitude, transistor 30 is turned off or rendered nonconductive in coincidence with their application thereto. As transistor 30 is turned off, the voltage between collector 34 and ground rises toward the bias voltage at terminal 42, however, this voltage is limited in amplitude by the breakdown potential of Zener diode 44. As the negative portion of the voltage applied to input 25 returns toward zero, transitor 30 again goes into saturation and the voltage at collector 34 again becomes essentially equal to zero; and, consequently, the voltage across zener diode 44 rapidly drops to zero. Therefore, in coincidence with the negative portions of an alternating voltage, an voltage pulse is developed at collector 34 having an amplitude which is determined by the breakdown voltage of Zener diode 44. It has a pulse width inversely proportional to the frequency of the applied voltage. Since these voltage pulses have a repetition rate equal to the frequency of the input voltage, they are proportional to the angular velocity of the shaft being monitored.

The differentiating network comprises of a capacitor 46 and resistors 48 and 50 differentiate each pulse into a positive and a negative polarity voltage spike. Diode 53 provides a path for the current of the negative polarity spikes to the ground, and diode 52 provides a path for the current of the positive polarity spikes into meter 28 which electro mechanically integrates them to provide a reading that is proportional to their frequency and, therefore, proportional to the angular velocity of the rotating shaft.

In addition to blocking the positive portions of the alternating voltage at the base of transistor 30, diode 43 serves as a protective mechanism for transistor 30 in case the positive supply voltage of terminal 42 is inadvertently applied to input terminal 25 during installation. Potentiometer 50 is adjustable to calibrate the indicating device of the invention, by shunting some of its current to ground, thereby providing correction for manufacturing differences in the components included in the system of the invention and adapting one indicating device for use in a plurality of separate applications, wherein it is desirable to get the same reading for different frequencies. If the polarity of the DC biasing voltage and the orientation of the diodes are reversed a PNP transistor could be substituted for NPN transistor 30. Furthermore, a transistor amplifier could be cascaded with the input terminal 25 to amplify, if necessary, the generated voltages applied thereto, thus extending the effective range of the instrument to include voltages having amplitudes that would otherwise be insufficient to turn transistor 30 off. Since these voltages generally occur at very low r.p.m., the affect of the amplifier would be to extend the lower limit of the range of the indicating device.

FIG. 3 shows a side view of a variable reluctance voltage generator of the invention which is comprised of magnetic pickup device 56 and circular disc 58 which are used to generate an alternating voltage having a frequency proportional to the angular velocity of shaft 59 fastened to disc 58. Magnetic pickup 56 includes a pair of magnets 60 and 62 respectively having like poles 68 and 70 that are juxtapositioned and held by clip 74 in an abutting relationship to core 72. The magnetic flux path of magnets 60 and 62 extend respectively from poles 68 and 70 to opposite poles 69 and 71. The flux from both magnets is in a reinforcing or adding direction through core 72 which is made of laminated, low reluctance pieces 76 and 78 to increase the electrical efficiency of the pickup. The magnitude of the flux present in core 72 at any given time depends on the total reluctance at that time in the flux path, which includes the space surrounding magnets 60 and 62. Inductor 80 is comprised of a multilayer coil around rectangular bobbin 82 which is slipped over core 72. The voltage across inductor 80 is proportional to the time rate of change of the magnetic flux through core 72. Pickup device 56 is positioned so that disc 58 which is made of low reluctance material is in the flux path of magnets 60 and 62.

Figure 4:
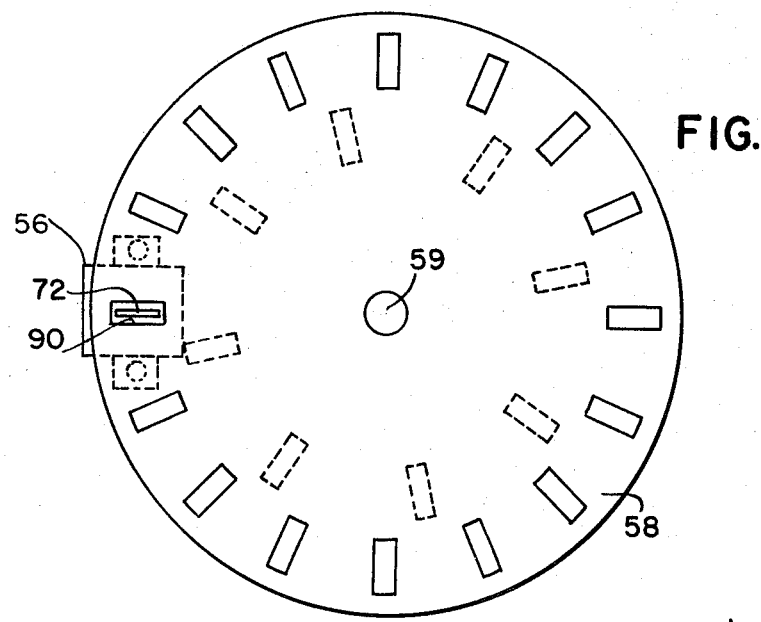
FIG. 4 shows a front view of a variable reluctance, alternating generator of FIG. 3.

It can be seen from FIG. 4 that disc 58 has first and second sets of apertures extending therethrough with each set including a plurality of apertures equally spaced around a circle on the face of disc 58 that is concentric with the circumference of the disc. The first set is drawn in solid lines and includes aperture 90. If for a particular application this first set is to be used, pickup device 56 must be positioned as shown such that its core 72 is exposed by each of the apertures as disc 58 is rotated by shaft 59.

In operation therefore, as disc 58 rotates the reluctance of the portion of the flux path between the end of core 72 and magnet poles 69 and 71 is alternately increased as an aperture exposes the core and then decreased as the low reluctance intervening magnetic material between the apertures eclipses the core. Since all the apertures in the given set pass core 72 for one revolution of shaft 59, the rate of change of reluctance depends upon the number of apertures and upon the angular velocity of the shaft. The varying magnetic flux through core 71, which is inversely proportional to the varying reluctance, induces an alternating voltage in inductor 80 whose frequency and amplitude vary in proportion to the angular velocity of shaft 59 and the number of apertures included on disc 58.

The invention is particularly useful to scale a given shaft r.p.m. so as to provide a reading of another variable which is proportional to that r.p.m. To a facilitate this scaling it is necessary to selectively choose the number of apertures in disc 58 according to the scale constant by which the r.p.m. must be multiplied to provide the desired reading. The following formula can be used to calculate some of the system parameters including the number of apertures for a given application:

$$N = \frac{(60 \text{ sec./min.}) F}{MK}$$

$N$ = number of apertures;
$K$ = scaling constant;
$M$ = full scale reading on the indicating device;
$F$ = frequency of the alternating voltage that produces the full scale reading on the indicating device.

For example, in one application where it is desired to measure the ground speed of a combine in miles per hour, it was found that a particular shaft turned at 84.7 r.p.m. for each mile per hour, therefore, the scale factor $K$ is equal to 84.7 r.p.m./miles/hour. The full scale reading $M$ corresponding to the maximum speed of the combine is 25 miles per hour and the meter 28 was found to have a full scale deflection for an alternating voltage having a frequency $F$ of 600 Hz being applied to input 25. By substituting these numbers into the above formula, the number of apertures $N$ was calculated to be about 17. When $N$ does not turn out to be sufficiently close to a whole number then the closest whole number to $N$ can be substituted into the above formula and it can be resolved to find another value for the frequency $F$. Then the indicating device of FIG. 1 can be adapted to have a full scale deflection at this new frequency. This can be done either by adjusting potentiometer 50 or by selecting another Zener diode 44 having slightly different Zener breakdown voltage or by a combination of both.

Other possible applications include the utilization of the scaling feature of the invention to provide readings on one scale for each of a plurality of shafts moving at substantially different maximum angular velocities. For example, in the above application it is desirable to individually measure the r.p.m. of the threshing drum, the r.p.m. of the engine, and the ground speed of the combine. It is also desired to present these readings on one scale, shown in FIG. 2, which is marked in increments from 0 to 25 for indicating 0 to 25 miles per hour when monitoring ground speed and 0 to 2500 r.p.m. when monitoring either the drum or engine r.p.m. The frequency $F$ necessary to cause full scale deflection on the indicating device has previously been established to be 600 Hz. Since the maximum reading $M$ established by the above specification is 2500 and for directly reading the r.p.m. of a shaft the constant $K$ is equal to 1, the above formula can be used to calculate that the number of apertures required in the two discs associated with the drum and engine shafts is essentially equal to 14. Therefore, one generator 10 including a disc having 17 apertures is driven by the axle, another generator 12 including a disc having 14 apertures is driven by a shaft connected to the engine crankshaft, and still another generator 14 including a disc having 14 apertures is driven by the drum drive line. As shown in FIG. 1 the output of any one of generators 10, 12 or 14 can be connected to the indicating device 26 through rotary switch 16. To simplify installation of the discs different sets of apertures can be provided on one disc as shown in FIG. 4.

What has been described, therefore, is a simple electromagnetic system for providing a reading proportional to the r.p.m. of one shaft or any one of a plurality of selected shafts by one indicating device. Scaling of the frequencies, and consequently scaling of the readings can be easily accomplished by selectively choosing the number of apertures in the discs of the various variable reluctance voltage generators to thereby facilitate the use of a single scale on the indicating device. Wires are utilized to transmit the signals from the generators to the indicating device thereby reducing the costs and complications of this electromagnetic system as compared to cable driven mechanical indicators.

I claim:

1. A system for sensing and measuring on a meter having one scale a reading of any one of a plurality of quantities representing different kinds of information, each of the quantities being directly proportional to the angular velocity of one of a plurality of rotating members, the rotating members having substantially different maximum angular velocities, such indicating system including in combination:

meter means including the meter having one scale and providing a reading which is proportional to the frequency of an alter alternating electrical signal applied thereto, said meter means providing a given maximum indication in response to a given maximum frequency of said alternating electrical signal;

one of a plurality of disc means connected to each of the rotating members, each of said disc means having apertures extending therethrough, said apertures being equally spaced around a circle on the face of said disc;

one of a plurality of variable reluctance pickup means being placed in a spaced relation to each of said disc means such that in response to the revolving of each of the plurality of rotating members said apertures on said disc are successively rotated past said pickup means to vary the reluctance therein, said varying reluctance being utilized to generate an alternating electrical signal at the output of each of said plurality of pickup means having a frequency which is proportional to the number of said apertures and the angular velocity of the rotating member;

said number of apertures in each disc being selected so that said plurality of said alternating voltages generated at the output of said plurality of pickup means have substantially said given maximum frequency in response to the different maximum angular velocities of the rotating members; and switch means having a plurality of input terminals each connected to said output of each of said pickup means, said switch means having an output terminal coupled to said meter means, said switch means being operable to connect any one of said alternating electrical signals to said meter means which provides a measuring indication in response thereto.

2. The system of claim 1 wherein said number of apertures in each of said discs is inversely proportional to the maximum angular velocity of the rotating members associated therewith.

3. The system of claim 1, wherein said meter means includes:

electron control means having output and control electrodes;

circuit means coupling said output terminal of said switch means to said control electrode for applying a selected alternating electrical signal through said switch means thereto to render said electron render means alternately conducting and nonconducting at the frequency of said selected signal;

voltage amplitude limiting means connected from said output electrode of said electron control means to a reference potential, said electron control means and said voltage amplitude limiting means cooperating to provide output pulses of constant amplitude and of repetition rate equal to the frequency of said selected signal;

electrical differentiating means coupled to said electron control means for developing voltage spikes in response to said output pulses; and the meter being connected to said electrical differentiating means and being responsive to said spikes to provide an indication on its scale which is controlled by said frequency of said selected signal.

4. The system of system of claim 3 wherein said electrical differentiating means includes a capacitor means connected in series with a variable resistor means, said variable resistor means being connected in parallel across the meter thereby providing an alternate path for the current caused by said voltage spikes, and adjustment of said variable resistor means thereby being effective to selectively adjust said indication of said meter so that it corresponds in a desired relationship to said frequencies of said voltage spikes applied thereto.

5. A ground speed and angular velocity measuring system utilizing the deflection of a needle included in a meter having one scale to indicate both the angular velocity of a first shaft associated with an automotive vehicle and the ground speed of the automotive vehicle which is proportional to the angular velocity of a second shaft, the first and second shafts having substantially different maximum angular velocities, such measuring system including in combination:

meter means including the meter having one scale and providing a reading indicated by a deflection of its needle which is proportional to the frequency of an alternating electrical signal applied thereto, said meter means providing a given maximum deflection of the needle in response to a given maximum frequency of said alternating electrical signal;

first signal generator means driven by the first shaft and generating a first alternating signal at its output the frequency of which is proportional to the angular velocity of the first shaft;

second signal generator means driven by the second shaft and generating a second alternating signal at the its output the frequency of which is proportional to the angular velocity of the second shaft and the ground speed of the vehicle;

said first and second signal generator means being responsive to the substantially different maximum angular velocities of the first and second shafts to provide said first and second alternating signals having substantially said given maximum frequency; and switch means having first and second terminals connected to said outputs of said first and second generator means, a third terminal connected to said meter means and means selectively connecting one of said first and second terminals to said third terminal so that the deflection of the needle of the meter having one scale can indicate the angular velocity of the first shaft and the ground speed of the automotive vehicle.